R. B. BOSSLER.
LEVEL VIAL.
APPLICATION FILED APR. 30, 1918.

1,309,752.                                              Patented July 15, 1919.

INVENTOR

UNITED STATES PATENT OFFICE.

ROBERT B. BOSSLER, OF PITTSBURGH, PENNSYLVANIA.

LEVEL-VIAL.

1,309,752.

Specification of Letters Patent. Patented July 15, 1919.

Application filed April 30, 1918. Serial No. 231,657.

*To all whom it may concern:*

Be it known that I, ROBERT B. BOSSLER, a citizen of the United States, and resident of Pittsburgh, in the county of Allegheny and State of Pennsylvania, have invented a new and useful Improvement in Level-Vials; and I do hereby declare the following to be a full, clear, and exact description thereof.

My invention relates to level vials.

The object of my invention is to provide a level vial which makes possible

1st, more rapid and exact leveling;

2nd, accurate and rapid adjustment of the leveling instrument;

3rd, one which facilitates and makes more accurate the use of the hand level; and 4th, one which is not affected by temperature.

Ordinarily a level bubble is adjusted by manipulating the instrument until each end of the bubble is equidistant from the center. Due to changes of length with temperature, the distance from the center to the ends is not constant and the equality of the distance must be assumed or guessed at, so that without great care, accuracy and rapid adjustment is not possible.

My invention consists, generally stated, in the suspension of a floating body within the bubble of a level vial, so that the said body being at the center of the bubble may be more accurately set and adjusted than the bubble itself may be.

Figure 1:
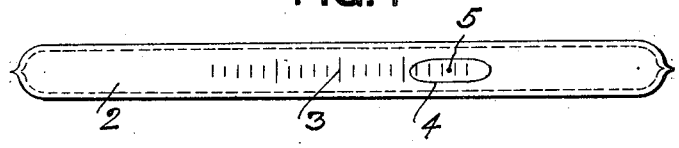
Figure 2:
Figure 3:
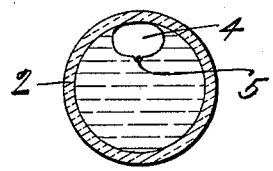

In the accompanying drawing, Figure 1 is a plan view of a level vial showing the body suspended in the bubble; Fig. 2 is a longitudinal section through the same; and Fig. 3 is an enlarged cross section.

In the drawing, the numeral 2 designates a vial of glass or other transparent material provided with the suitable scale 3. The vial contains a suitable liquid which is sealed within the vial to form the bubble 4. In practice I prefer to use a liquid containing a salt or salts such that a small body or ball 5 will float upon it within the bubble, and which will not dissolve the material of which said ball is made nor freeze under low temperature conditions.

The ball 5 may be of any suitable material, but I have found that a small ball of wax or paraffin is especially adapted for the purpose, as said material is opaque, so as to be readily detected by the eye. I prefer also to use an oiled wax, as a ball of this composition will more readily adjust itself in the center of the bubble.

In using my improved level vial, the suspended ball or particle may be immediately brought into register under the central mark under all conditions, as shown in Fig. 2.

What I claim is:

1. A spirit level-vial having therein a liquid in which is a bubble, and a foreign body suspended within the bubble.

2. A spirit level-vial having therein a liquid in which is a bubble, and an opaque foreign body suspended within the bubble.

3. A spirit level-vial having therein a liquid in which is a bubble, and a body of wax suspended within the bubble.

4. A spirit level-vial having therein a liquid in which is a bubble, and a body of oiled wax suspended within the bubble.

In testimony whereof, I, the said ROBERT B. BOSSLER, have hereunto set my hand.

ROBERT B. BOSSLER.

Witnesses:
JOHN F. WILL,
J. R. KELLER.

Copies of this patent may be obtained for five cents each, by addressing the "Commissioner of Patents, Washington, D. C."